Figure 1:
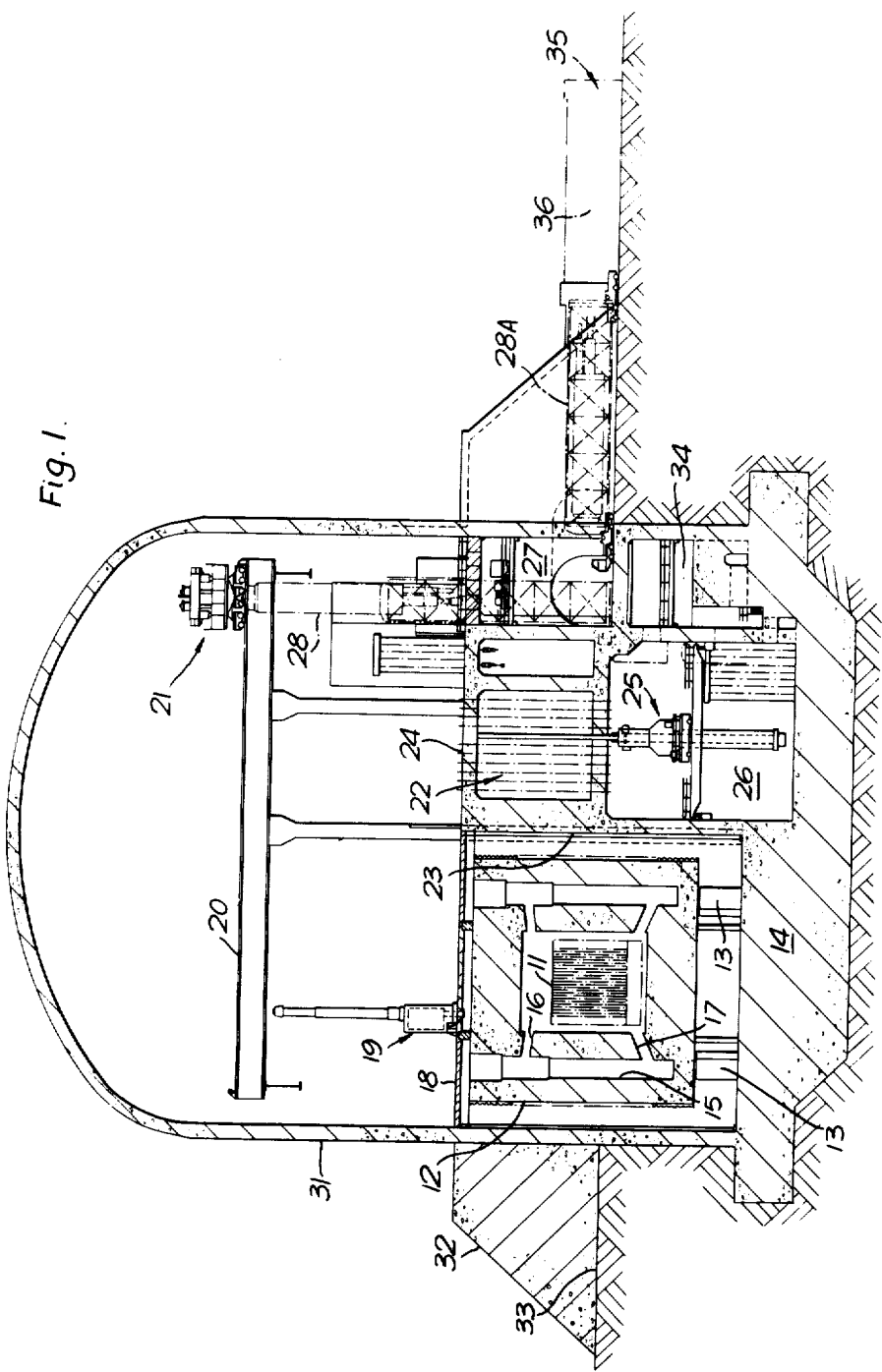

United States Patent

Webber et al.

[11] 4,033,815
[45] July 5, 1977

[54] NUCLEAR REACTORS

[75] Inventors: John William Robert Webber, Ashby Parva, near Lutterworth; Anthony Charles Roberts, Blaby, both of England

[73] Assignees: Nuclear Power Company (Whetstone) Limited, Whetstone; Taylor Woodrow Construction Limited, Southall, both of England

[22] Filed: May 7, 1975

[21] Appl. No.: 575,360

[52] U.S. Cl. .................. 176/87; 176/37; 176/38
[51] Int. Cl.² .......................... G21C 13/00
[58] Field of Search ............ 176/30, 31, 32, 37, 176/38, 87

[56] References Cited
UNITED STATES PATENTS

| | | | |
|---|---|---|---|
| 3,677,328 | 7/1972 | Buzzi et al. | 176/30 X |
| 3,713,968 | 1/1973 | Kennedy et al. | 176/87 X |
| 3,752,738 | 8/1973 | Naymark | 176/87 |
| 3,847,733 | 11/1974 | Ventre | 176/87 X |
| 3,865,688 | 2/1975 | Kleimola | 176/38 X |
| 3,899,391 | 8/1975 | Sulzer et al. | 176/38 X |
| 3,937,651 | 2/1976 | Schabert et al. | 176/38 |

*Primary Examiner*—Peter A. Nelson
*Attorney, Agent, or Firm*—Kirschstein, Kirschstein, Ottinger & Frank

[57] ABSTRACT

In a nuclear reactor installation comprising a fluid-cooled nuclear heat source within a primary pressure vessel, this latter and also auxiliary facilities including new and spent fuel stores are enveloped together within an outer envelope which is designed to afford protection from external missiles; but within this envelope the auxiliary facilities are isolated from the primary pressure vessel by pressure tight structure which, with the major part of the outer envelope, constitutes secondary containment means of the installation.

8 Claims, 2 Drawing Figures

NUCLEAR REACTORS

This invention relates to nuclear reactor installations.

In various designs of nuclear reactor (such, for example, as that known as the High Temperature Reactor) the nuclear heat source (that is, the core of the reactor or corresponding other means in which nuclear energy is converted into heat) is housed within a pressure vessel which may be of reinforced concrete and which may house all or part of one or more primary coolant circuits by means of which heat is extracted. Thus heat exchangers or gas turbines incorporated in such primary coolant circuits to extract heat therefrom may be housed within the pressure vessel or within the thickness of its walls, or may be disposed outside the pressure vessel.

It has become an accepted design practice to envelop the pressure vessel (constituting a primary pressure vessel of the installation) and any parts of the primary coolant circuits which are not enclosed within the primary pressure vessel (but which would nevertheless be disposed in close proximity thereto) within a secondary containment means of adequate strength and integrity to resist the effects of an explosive accident causing rupture of the pressure vessel or other parts of the primary coolant circuits external thereto, and to contain escapes of pressure and of radioactive materials, as well as any missiles, resulting from such an accident. Recently, also, it has been seen as important to protect the pressure vessel from external missiles such as crashing aircraft, and it has been appreciated that the secondary containment means referred to above may be designed to serve this function additionally.

In such known designs, refuelling of the reactor, or the replacement of other parts of the structure within the primary pressure vessel, has required that the new and spent fuel, and such other parts of the structure as may be involved in replacement, be transferred between the interior and exterior not only of the primary pressure vessel but also of the secondary pressure containment means. Now it is necessary that spent fuel, and possibly at least some of said other parts involved in replacement, should be retained, after removal from within the primary pressure vessel, for an extended period (such as 100 days) to allow for a sufficient fall-off of its level of radioactivity, in a special "hot" store facility which has not hitherto been disposed within the secondary containment means and which, indeed, is preferably not so disposed since for safety reasons it is usual to prohibit personnel access within the containment means while the reactor is on load whereas the possibility of personnel access to the "hot" store facility is desirable.

However, for the same reasons that protection of the primary pressure vessel from external missiles such as crashing aircraft is desirable, it is desirable also that the "hot" store facility should be similarly protected and shielded; and it is an object of the present invention to provide a nuclear reactor installation whose design takes full account of the foregoing considerations.

According to the invention, there is provided a nuclear reactor installation comprising a fluid-cooled nuclear heat source, a primary pressure vessel containing the heat source, and an outer envelope surrounding the primary pressure vessel and providing external-missile protection therefor, wherein there are provided a floor, dividing the outer envelope internally into upper and lower sections, and an internal wall, dividing the lower section into respectively a first part containing the primary pressure vessel and a second part, the said internal wall and that part of the floor disposed over the said second part of the section below the floor being made pressure-tight with respect to each other and to the outer envelope and constituting therewith a secondary containment means of the installation, the said second part of the section below the floor containing shielded facilities including a new fuel store and a spent fuel store, and there being provided in the said upper section handling means for transporting reactor components, including nuclear fuel, between the interior of the primary pressure vessel and the said shielded facilities through normally-closed access apertures in the primary pressure vessel and in the said floor.

In one preferred embodiment of the invention, the outer envelope is constituted by a cylindral wall having a lower end standing on and integral with a foundation raft and an upper end closed by an intregral dome, the primary pressure vessel being supported on the foundation raft; and the handling means in the said upper section comprises a gentry-mounted crane, movable between positions above the primary pressure vessel and positions above the said shielded facilities, and handling machines transportable by the crane.

Figure 2:
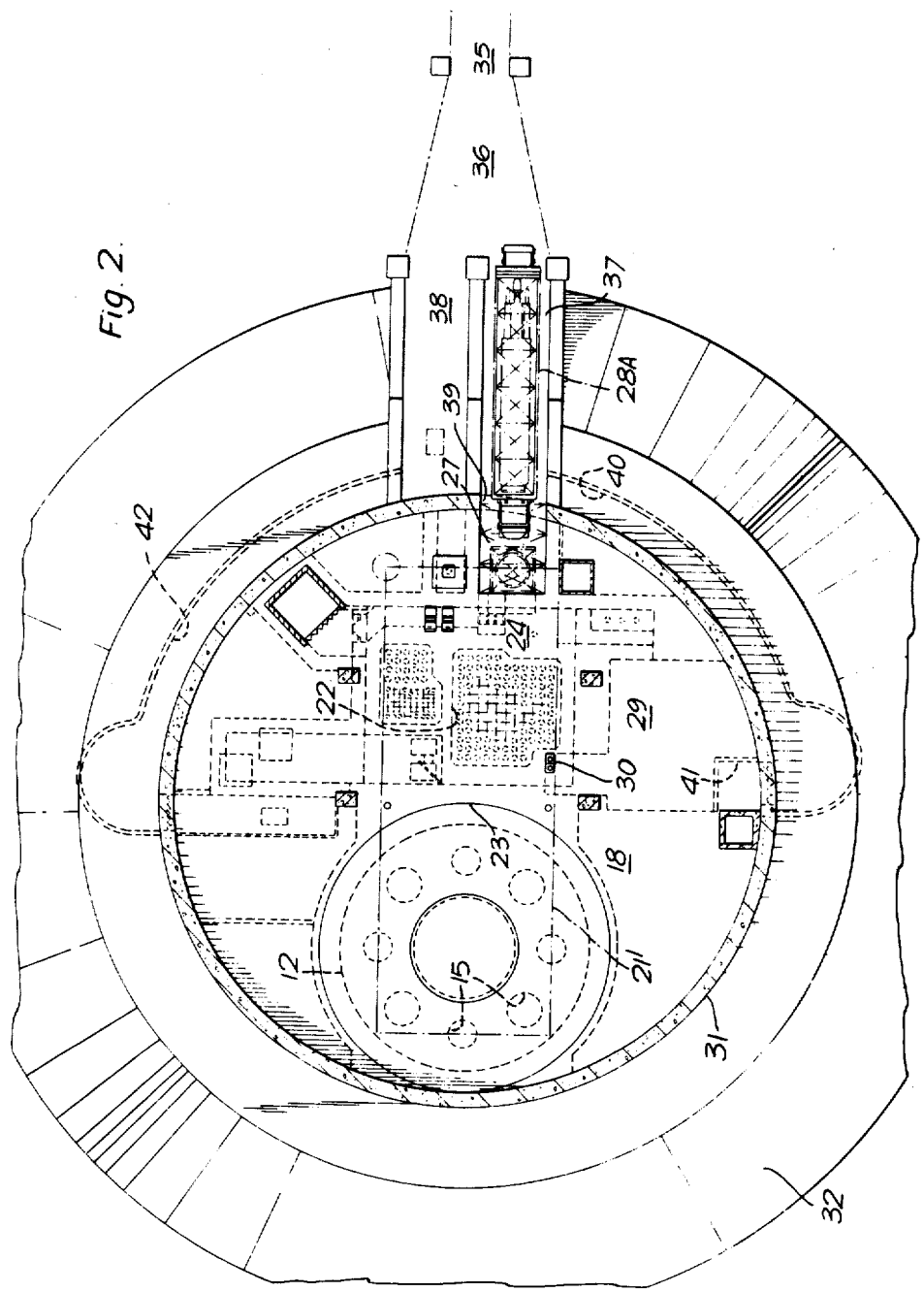

Such an embodiment of a nuclear reactor installation according to the invention is described below with reference to the accompanying drawings, in which:

FIG. 1 is a vertical sectional view of a nuclear reactor installation in accordance with the invention, and FIG. 2 is a horizontal sectional view of the installation shown in FIG. 1.

The reactor of the installation shown in the drawings is of the kind shown as the High Temperature Reactor, though it will be understood that the invention is not limited to reactors of this kind.

As shown in the drawings, a core 11 of the reactor is housed in known manner within a primary pressure vessel 12 of reinforced concrete, supported on legs 13 which stand on a massive foundation raft 14. Within the thickness of the walls of the vessel 12 are formed, in known manner, chambers 15 which communicate through ducts 16 and 17 with the interior proper of the vessel and which house heat exchangers (not shown) and coolant-gas circulators (not shown) which force pressurised coolant gas through the ducts 16, down through the core 11, and thence (through the ducts 17) back to the chambers 15 and through the primary sides of the heat exchangers contained therein, prior to being recirculated.

The roof of the pressure vessel 12 is formed in known manner with normally-plugged penetrations (not shown) giving access to the core 11 and chambers 15 for refuelling purposes and for removal and replacement as may be necessary of parts of the core structure other than those containing fuel and of heat exchangers and coolant-circulator pumps. A pile cap 18 above the pressure vessel 11, formed with slabs which are removable to give access to the said penetrations, supports by a refuelling machine 19; and a gantry 20 supports a crane 21 by means of which the refuelling machine can be moved over the pile cap and, also, removable components not handled by the refuelling machine can be removed and transported.

The gantry 20 extends (to the right in FIG. 1) beyond the periphery of the pressure vessel 11 and over a spent-fuel store 22 disposed alongside the pressure vessel 11 and separated therefrom by a pressure-resistant wall 23. The store 22 has a pressure-resistant roof 24 level with the pile cap 18 and formed, like the roof of the primary pressure vessel 11, with normally-plugged penetrations (not shown) giving access from above to the spent-fuel store 22. Thus, when spent fuel has been removed from the core 11 by the refuelling machine 19 and is temporarily held therein, the refuelling machine is moved by the crane 21 from its position on the pile cap 18 to a position on the roof 24 from which it can deposit the spent fuel into the store 22, where it will remain for a suitable decay period.

A decayed-fuel transfer machine 25, with access from below to the store 22 and housed in a chamber 26 which is also separated by the wall 23 from the pressure vessel 11, is provided for the eventual removal of spent fuel from the store 22.

The roof 24 and gantry 20 extend also over a chamber 27 through which heat-exchanger and coolant-circulator assemblies (like that indicated by reference 28) removed from the chambers 15 by means of the crane 21 can be discharged, after temporary removal of this extension part of the roof 24, from the reactor installation as shown at 28A. (The area over which the crane 21 can provide a vertical lift is indicated in FIG. 2 by a chain-line rectangle referenced 21'.)

The structure which composes the spent fuel store 22, chamber 26 and chamber 27 (and other spaces not specifically referred to above, but also including a new-fuel store 29 and a new-fuel transfer position 30 which is acessible to the refuelling machine 19) is built, for seismic safety reasons, on the same raft 14 which supports the primary pressure vessel 11. Also built on, and structurally integral with, the raft 14 is an outer envelope 31 which, in combination with the raft 14, envelops substantially the whole of the reactor installation as above described. The raft 14 and the lower part of the envelope 31 may be below the upper surface of a surrounding earth bulwark 32 provided above ground level 33, but the exposed upper part of the envelope 31 constitutes a protective shield against external missiles such as crashing aircraft; and the envelope 31 is designed accordingly.

The pile cap 18 and roof 24 together constitute, within the outer envelope 31, a floor dividing it into an upper section, in which the crane 21 operates, and a lower section which is divided by the wall 23 into a first part (containing the primary pressure vessel 12) and a second part which contains the chamber 27 and various shielded facilities including the new and spent fuel stores 29 and 22. The wall 23 and the part of the said floor which is constituted by the roof 24 are pressure-tight and integral with respect to one another and to the raft 14 and envelope 31 with which they are made structurally continuous, and constitute therewith a secondary containment means of the installation, this secondary containing means totally enveloping the primary pressure vessel 12 and the space in which the crane 21 operates and being designed to serve the function of a secondary containment means as referred to in the opening paragraphs of this specification, as well as to protect against external missiles. The second part of the space within the enclosure 31 and raft 14, that is, that part below the roof 24, which contains the shielded facilities including the new and spent fuel stores, is outside the secondary containment means (being isolated therefrom by the wall 23 and roof 24) but is nevertheless within the envelope 31 and thus protected and shielded from external missiles.

Thus the above-described installation provides an integrated unitary construction in which not only are secondary containment means and external-missile protection obtained for the primary pressure vessel 11 but also the external-missile protection is provided for those immediately associated parts of the installation, such as the stores for new and spent fuel, for which it is almost equally important.

It will be understood that the space within the secondary containment means (i.e. above the floor constituted by the pile cap 18 and roof 24, and immediately surrounding the pressure vessel 11) may be maintained during normal operation of the installation either at atmospheric or sub-atmospheric pressure or at a higher pressure intermediate between atmospheric and that obtaining within the pressure vessel 11 but that, since that space is isolated by the wall 23 and roof 24 from the remaining space within the envelope 31, this remaining space (containing inter alia the store 22 and chamber 26) may be at atmospheric pressure and is, moreover, protected from sudden pressure surges and flying missiles which a core accident could occasion, with the reslt that this remaining space is a safe area so far as core accidents are concerned and restricting on access by personnel may be correspondingly less stringent than would otherwise be necessary. In particular, handling of new fuel, and of spent fuel by means of the machine 25, can be safely undertaken by personnel situated in a viewing and manipulating gallery 34, even while the reactor installation is in a full-power mode.

The above-described installation design, being virtually totally enclosed, also offers advantages in terms of security against sabotage and other unauthorised ingress. As best seen in FIG. 2, a single access gateway 35 may lead through an enclosed security-check compound 36 to a receiving bay 37 and a dispatch bay 38. Large received replacement components (such as the illustrated heat exchanger assembly 28A or a new replacement for it), which are to be handled by the crane 21, will be passed through an aperture 39, in a part of the envelope 31 which does not constitute part of the secondary containment means, into and through the chamber 27; and for these large components the receiving bay 37 will also be utilised as a dispatch bay. New fuel, on the other hand, will be routed through an inclined subterranean passage 40 from the bay 37 to a loading bay 41 from which it can be taken into the new fuel store 29. Correspondingly, spent fuel which has been held for the requisite period in the store 22 will be discharged from there through an upwardly inclined subterranean passage 42 to the dispatch bay 38.

We claim:

1. A nuclear reactor installation comprising a fluid-cooled nuclear heat source, a primary pressure vessel containing the heat source, and an outer envelope surrounding the primary pressure vessel and providing external-missile protection therefor, wherein there are provided a floor, dividing the outer envelope internally into upper and lower sections, and an internal wall, dividing the lower section into respectively a first part containing the primary pressure vessel and a second part, the said internal wall and that part of the floor disposed over the said second part of the section below the floor being joined in pressure-tight manner to each other and to the outer envelope and constituting therewith a pressure-tight secondary containing means of the installation which secondary containment means encompasses the said upper section and the said first part of the said lower section but excludes the said second part of the section below the floor, the said second part containing shielded facilities including a new fuel store and a spent fuel store, and there being provided in the said upper section handling means for transporting reactor components, including nuclear fuel, between the interior of the primary pressure vessel and the said shielded facilities through normally-closed access apertures in the primary pressure vessel and in the said floor.

2. A nuclear reactor installation as claimed in claim 1, wherein the outer envelope comprises a foundation raft, a cylindrical wall having a lower end standing on and integral with the foundation raft and an upper end, and a dome integral with the said upper end of the cylindrical wall and closing the same, the primary pressure vessel being supported on the foundation raft.

3. A nuclear installation as claimed in claim 1, wherein the handling means in the said upper section comprises a gantry-mounted crane, movable between positions in the upper section which are above the primary pressure vessel and positions in the upper section which are above the said shielded facilities, and handling machines transportable by the crane.

4. A nuclear installation as claimed in claim 1, wherein a part of the said floor which is disposed over the said second part of the section below the floor is temporarily removable to give access to a chamber in said second part, and the outer envelope is formed with an aperture through which the said chamber is open to the exterior of the installation.

5. A nuclear installation as claimed in claim 4 and provided with two bays for external-transport reception and dispatch, wherein the said aperture opens outwardly into one of the two bays.

6. A nuclear installation as claimed in claim 5, wherein the new and spent fuel stores, accessible from above to the handling means above the said floor, are also accessible from below for insertion of new fuel and removal of spent fuel respectively, and there are provided protected access routes, each opening into a respective one of the said two bays, for movement of new and spent fuel.

7. A nuclear installation as claimed in claim 6, wherein the outer envelope extends above and below ground level, the said two bays are at ground level, the said floor in the outer envelope is above ground level, and the said access routes are tunnels which, at their ends remote from the said two bays, are below ground level and communicate with respective subterranean chambers disposed below, and giving access to, the new and spent fuel stores respectively.

8. A nuclear installation as claimed in claim 7, wherein the outer envelope above ground level is protected, at least up to the level of the said floor within it, by a surrounding earth bulwark.

* * * * *